(12) United States Patent
Ali-Vehmas

(10) Patent No.: US 6,359,867 B1
(45) Date of Patent: Mar. 19, 2002

(54) DYNAMIC CHANNEL ALLOCATION

(75) Inventor: Timo Ali-Vehmas, Salo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/091,330

(22) PCT Filed: Nov. 11, 1997

(86) PCT No.: PCT/FI97/00684

§ 371 Date: Jun. 16, 1998

§ 102(e) Date: Jun. 16, 1998

(87) PCT Pub. No.: WO98/23118

PCT Pub. Date: May 28, 1998

(30) Foreign Application Priority Data

Nov. 15, 1996 (FI) .................................................. 964578

(51) Int. Cl.[7] .................................................. H04Q 7/00
(52) U.S. Cl. .................. 370/331; 370/329; 455/450
(58) Field of Search ................................ 320/331, 329, 320/335, 336, 341, 342, 343, 344, 345, 347, 310, 431, 441, 442, 468, 465, 330; 455/436, 450, 452

(56) References Cited

U.S. PATENT DOCUMENTS 5,491,837 A * 2/1996 Haartsen ...................... 455/62
5,673,260 A * 9/1997 Umeda et al. ............... 370/342
5,933,777 A * 8/1999 Rahman ...................... 455/450
5,995,836 A * 11/1999 Wijk et al. ................... 455/436
6,021,309 A * 2/2000 Sherman et al. ........... 455/12.1
6,052,385 A * 4/2000 Kanerva et al. ............ 370/468

* cited by examiner

Primary Examiner—Alpus H. Hsu
Assistant Examiner—Brian Nguyen
(74) Attorney, Agent, or Firm—Altera Law Group

(57) ABSTRACT

According to the invention, a pilot signal 4 is transmitted from a base station on each available carrier. This is done for each available carrier and in every time slot of the carrier irrespective of whether or not a useful signal is transmitted in the time slot. The pilot signal contains a limited quantity of information concerning the base station, such as information about the radio interface. The information is time slot synchronized so that the same information is transmitted in every time slot. The pilot signal level varies, and in time slots which are in traffic use it is suitably lower than the level of the useful signal 1 proper, but in idle time slots it has a very low static level. It has the same band width Df as the normal useful signal. However, it is coded in a different way than the useful signal and in such a way that although it almost drowns in noise, it can still be extracted from the noise. The mobile gets information from the pilot signal on the state of channels (time slots) in the uplink direction. When deciding to perform channel exchange, it chooses any free channel it likes and transmits an access burst to the base station on this channel. If the base station accepts the channel, it will transmit back an access grant burst on the same channel, whereafter the base station and the mobile will immediately transfer the traffic to this channel.

13 Claims, 2 Drawing Sheets

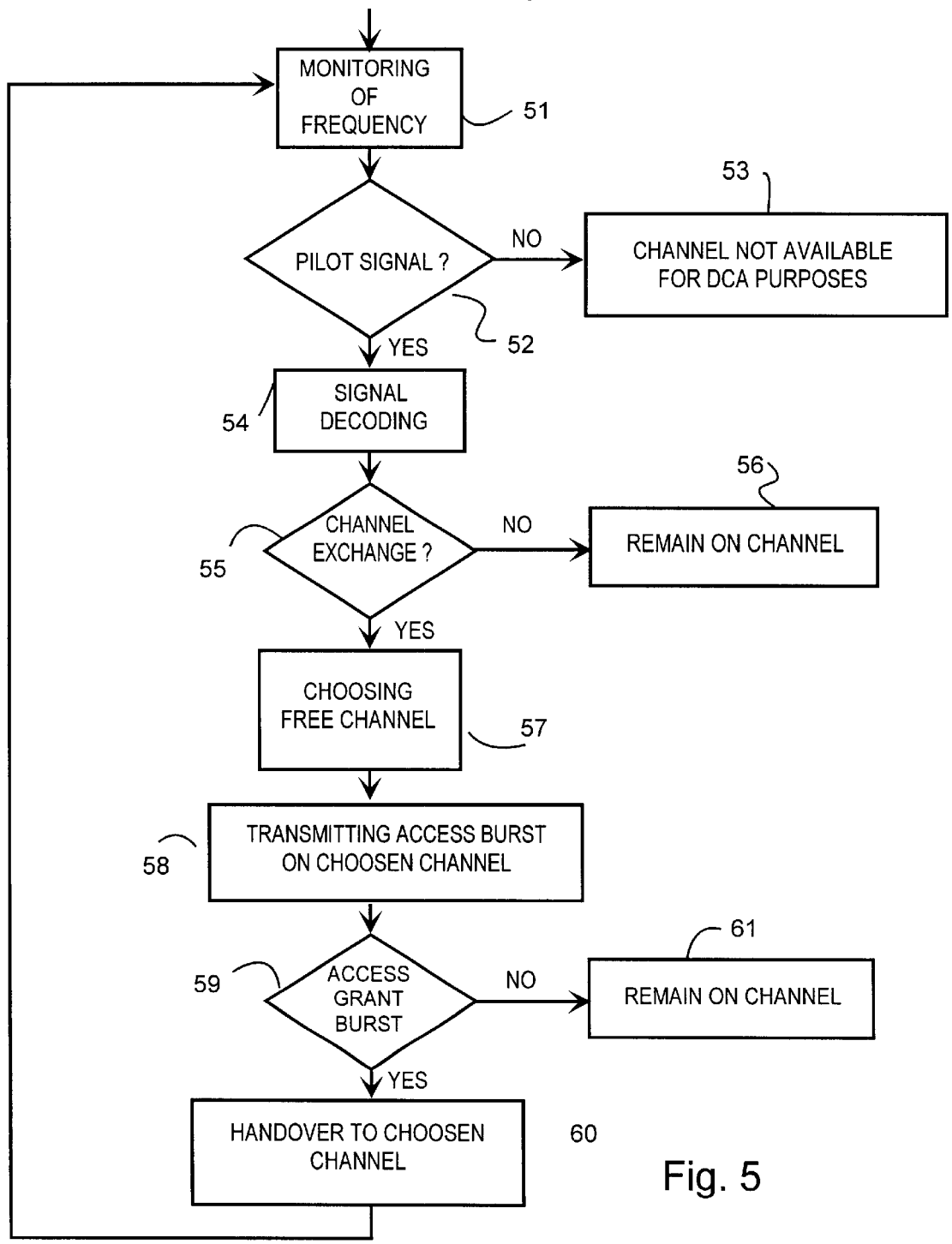

DYNAMIC CHANNEL ALLOCATION

FIELD OF THE INVENTION

Figure 1:
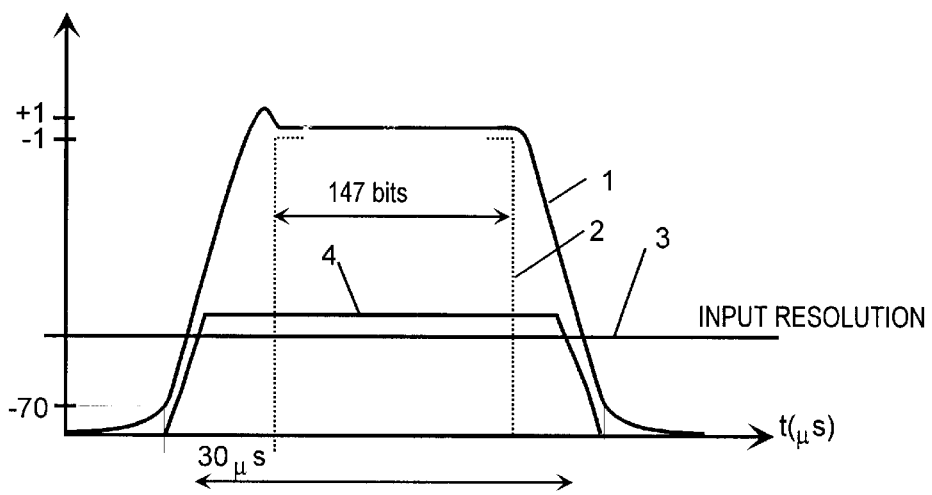

This invention concerns allocation of radio channels in a radio system using both time division and frequency division at the same time.

BACKGROUND OF THE INVENTION

In a radio system, the great number of mobile terminal equipment, such as mobile stations, on the one hand and the band width requirements of multimedia applications on the other hand make it necessary to utilize as efficiently as possible the frequency spectrum allocated for the system. The interference caused by the radio environment or by other terminal equipment of the system is a fundamental factor limiting reuse of frequencies. It can be reduced by developing efficient radio subsystems and channel allocation techniques. Time and space diversity, low-noise filters and efficient channel correctors and modes of modulation are used in radio and transfer subsystems to reduce interference and to separate the desired signal. However, the factor limiting system total capacity more than any other factor is co-channel interference caused by reuse of frequencies. In fact, the basis for algorithms used in channel allocation is to use loss characteristics of radio wave propagation to minimize the carrier-to-interference or CIR ratio and thus to boost reuse of the radio spectrum.

Channel allocation means dividing a given frequency spectrum into a set of adjacent or non-interferring channels, all of which may be used simultaneously while the quality of the received signal remains acceptable. Several known techniques are available for dividing channels, such as Frequency Division (FD), Time Division (TD) or Code Division (CD). In frequency division, the separation of channels is brought about by dividing the spectrum into adjacent frequency bands, in time division by dividing the frequency into sequential time periods or time slots, while in code division the separation of channels is obtained by using different modulation codes. As an example of a cellular system using a combination of FD and TD, the known GSM mobile system is mentioned, whereas Digital European Cordless Telecommunication (DECT) is mentioned as an example of a TD system.

The distance at which the same channel may be reused so that CIR remains acceptable, is called the reuse distance of the same channel. On the other hand, since CIR is a function of the reuse distance and transmission power, the interference level may be lowered in a cellular system by increasing the distance between base stations or by using dynamic control of the transmission power.

At least fixed channel allocation (FCA) and dynamic channel allocation (DCA) are channel allocation methods.

In fixed channel allocation, the range is divided into cells, for each of which a set of frequencies is allocated according to some reuse pattern. Simplicity is an advantage of this allocation, but it suffers from an inability to adapt to traffic situations and to the numbers of mobile subscribers in the cells.

In dynamic channel allocation, all channels are in a "channel pool" and channels are taken from the pool for new calls as calls come to the system, making sure at the same time that the minimum CIR is maintained. Thus, there is no fixed relation between channels and cells, but any channel may be choosed by any cell provided that the signal interference is acceptably low. Different dynamic ways of allocation can be distinguished depending on how the channels are chosen. Advantages of this allocation are great flexibility and an ability to adapt to changing traffic, but it is less efficient than fixed channel allocation if the load is very high. Dynamic channel allocation is described thoroughly in the publication IEEE Personal Communications, June 1996; Channel Assignment Schemes for Cellular Mobile Telecommunication Systems; A Comprehensive Survey; I. Katzela, M. Naghshineh.

The present TDMA/FDD-based cellular mobile systems mainly use fixed channel allocation FCA. Advanced systems also use frequency jumping to improve the quality of the connection for averaging loss and interference. In a frequency jumping pattern only the traffic channel frequency can be changed or, besides that, also the time slot. Should the signal quality become poorer and fall below an acceptable limit due to a change in the environment or a movement of the mobile, a change of channel or handover is performed, whereby the channel is exchanged for another while the connection remains the same with the base station (a so-called intra cell handover) or the connection is transferred to pass through another base station (so-called intra cell handover). Handover may thus be caused by qualitative deterioration of the radio link, or then the network may command the mobile to perform the handover, because the network wishes to rearrange the channels in order to avoid congestions.

In the first-mentioned case, the mobile performs continuous measurements of the connection quality, usually calculation of the bit error ratio, and measurements of carrier powers of adjacent base stations and transmits the measurement results to the network at regular intervals. The network uses these measurement results in its making of decisions on handover. In such a case, the handover is mobile assisted handover. If in intracellular handover no free channels are found from the cell's own base station or in channel exchange between cells from that adjacent base station to the cell of which the mobile is going, then disconnection must be done. When the capacity is increased in a cellular system by reducing the cell size and in a system, where the cell size is very small from the start, in a so-called mikrocell system, channel exchange must be done several times during a call. In addition, when the number of users grows, not only will it be increasingly more difficult to maintain a good service level, but it will also become increasingly probable that no free channels will be found.

Dynamic channel allocation is used in the DECT system, which is in accordance with TDMA/TDD, that is, transmission and reception take place at the same frequency. In such a system channel exchange may be performed by the mobile and not by the network as in, for example, the GSM system. This is possible because the mobile is able to monitor all channels in the uplink and downlink directions and thus it has constant information about the condition of the radio interface, that is, about free and busy channels and about their interference levels.

To increase the capacity in any TDMA/FDD system it would be natural to use dynamic channel allocation DCA instead of fixed channel allocation, but in such a way that the mobile and not the network could choose the channel from the set of free channels. Hereby the new channel would be taken from a pool containing several channels also in channel exchange situations. A problem when using DCA in this form is that although many channels are available, all of them can not be used. The mobile can not perform the choice of a new channel at random, because a channel picked at random may already be in use. Since the mobile lacks information about the state of the radio interface, especially about the state of channels in the uplink direction, the mobile is thus unable to perform any exchange of channels. No method of acquiring such information has been presented so far.

It is an objective of the present invention to provide a method allowing use of dynamic channel allocation also in TDMA/FDD systems so that a mobile is able itself to choose the channel it will use and thus to perform channel exchange. Channel exchange must be possible at least within the cell and at least to another time slot of the same frequency, but preferably also from one cell to another.

The established objective is achieved with the attributes described in the independent claims.

BRIEF SUMMARY OF THE INVENTION

According to the invention, a special very low-level signal, which is called pilot signal hereinafter, is transmitted continuously on a carrier from a base station. This is done for every avilable carrier and in its every time slot irrespective of whether or not a useful signal (traffic bursts) is transmitted in the time slot. The information contained in the pilot signal is time slot synchronized so that the same information is transmitted in each time slot. Hereby, in order to obtain all information, it will suffice at a minimum that the receiver receives just any one time slot at the frequency in question and decodes the information of the pilot signal from it.

In the time slot where the useful signal is transmitted, the pilot signal level is lower than that of the useful signal proper and it has the same band width as a normal useful signal. However, it is coded in a different way than the useful signal, so even though the frequency is the same as for the useful signal, the pilot signal can be detected in the receiver.

In a time slot where the useful signal is not transmitted, the pilot signal level is very low, but still such that although it almost drowns in noise, it can still be extracted therefrom.

The pilot signal contains a limited number of information concerning the base station. The most important piece of information is whether the channels of the concerned frequency are available for dynamic channel allocation, that is, whether uplink direction channels corresponding to downlink directions are in use. When desired, the signal can also contain information identifying the base station, whereby based on this information the mobile is able to distinguish between base stations. In addition, the pilot signal may contain limited synchronization information, if the network is not synchronic.

It is advantageous from a practical point of view if the dispersion sequence of the pilot signal is directly in a known relation to synchronization bursts transmitted by the base station. Hereby base stations according to the CDMA system need not be in synchrony, but the mobile may calculate the timing of the adjacent station from the pilot signal which it receives from this.

The base station may also on a broadcasting channel transmit information to the cell that the pilot signal is in use, whereby mobiles able to utilize it may operate in a correct manner.

The mobile receives a carrier-frequency signal at other times than in the actual reception time slot, it decodes a pilot signal from it, if there is one, and it obtains information from the signal about the state of channels (time slots) in the uplink direction. When deciding to perform handover, it selects the free channel it desires and transmits an access burst on this to the base station. If the base station accepts the channel, it will transmit back an access grant burst on the same channel, whereupon the base station and the mobile will immediately transfer the traffic to this channel.

LIST OF FIGURES

Figure 2:
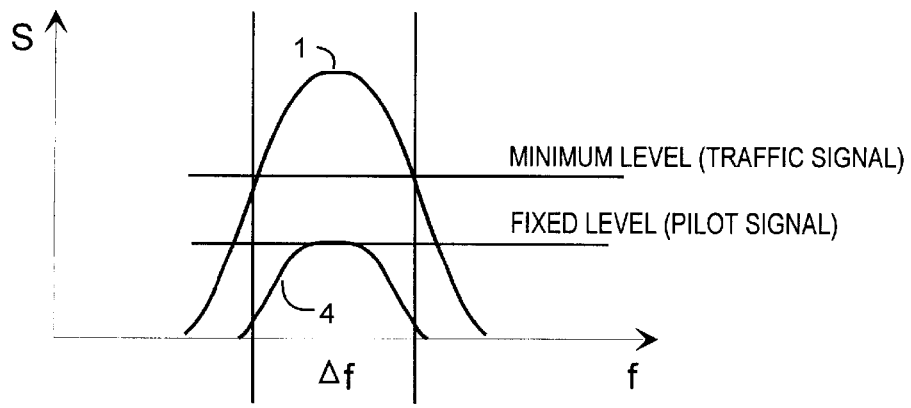
Figure 3:
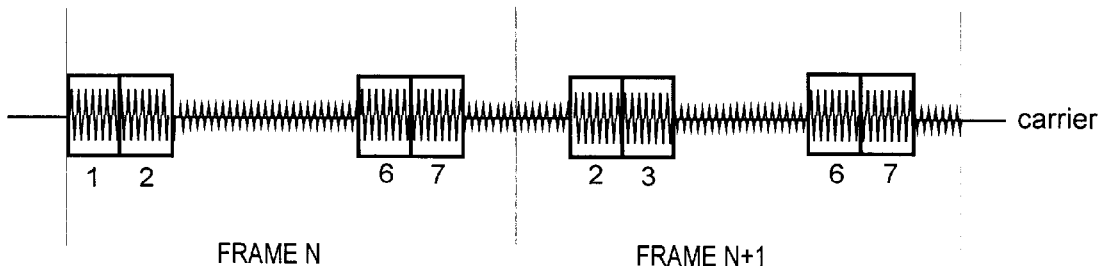

The invention will be described in greater detail with the aid of the appended figures, wherein FIG. 1 shows a pilot signal and a user signal as functions of time, FIG. 2 shows the energy spectrum of signals as a function of frequency, FIG. 3 illustrates the contents of different time slots of a frame, FIG. 4 shows possible fields of a pilot signal, and FIG. 5 is a flow chart of channel exchange.

DETAILED DESCRIPTION OF THE INVENTION

FIG. 1 shows a transmission burst of a TDM/FDD system. The system used as example is a GSM system.

Transmission takes place as a burst in a transmission time slot. During the time slot, the envelope amplitude 1 of the transmission signal rises from an initial value of zero to a nominal value, whereupon the signal phase is modulated for transmitting a bit packet comprising 147 bits. Then, at the end of the time slot, the transmission signal amplitude will again drop to zero. A normal burst contains two 58-bit periods with a 26-bit instruction period in between. There are 3 tail bits in the beginning and end of the burst. To prevent received sequential bursts from overlapping, there is a safety time in the end of each burst. The actual length of the safety time depends on the envelope of the transmission burst, but generally speaking the safety time is defined as the time in which the burst signal is below −70 dB (or −36 dB, depending on which is higher). Hereby, the safety time will be about 30 microseconds. A safety time is necessary, because mobiles transmitting on the same radio carrier are at a random distance from the base station, whereby the transmission time of radio waves from the base station to the mobile will vary on a time slot basis. For this reason, the duration of bursts to be sent in time slots must be a little shorter than the time slot, so that bursts transmitted in adjacent time slots will not overlap when the base station is receiving.

Mobile receivers have a definite input resolution 3 and the receiver is not able to distinguish from noise such signals which are weaker than the input resolution. The input resolution varies from one receiver to the next, so input resolution 3 in Figure is only suggestive.

According to the invention, a low-level pilot signal 4 is added to each available carrier at the base station, FIG. 1. It is added constantly to the carrier, so that it will occur at every time slot whether or not it is in traffic channel use. However, the information contained in the pilot signal is time slot synchronized so that the same information is transmitted at each time slot, that is, all information contained in the pilot signal may be received during one time slot. It is hereby advantageous that the dispersion code of the pilot signal is in some known relation to the synchronizing bursts.

When the pilot signal is transmitted during the actual useful signal, envelope 1, its level must be lower in some suitable relation than the level of the useful signal. A suitable difference between signals could be such, for example, that the pilot signal level is lower by about 20 dB than the level of the useful signal. When using power control, the level of the useful signal varies, so the pilot signal level will vary in the same proportion.

When the pilot signal is transmitted in a time slot where no useful signal is transmitted, it might cause interference in receivers operating at the same frequency. For this reason, its level must be very low, but still above the normal input resolution of the system's receiver, so that the normal reception procedure will be able to distinguish it from noise.

FIG. 2 shows the same as FIG. 1, but now as a function of frequency. When the carrier band is Df, the energy spectrum of user data is as shown by curve 1, while the energy spectrum of the pilot signal is as shown by curve 4. Thus pilot signal 4 has the same band width as traffic signal 1, but the pilot signal level is considerably lower than the minimum level of the traffic signal.

FIG. 3 illustrates the idea of the invention with the aid of frames. A system is shown as an example wherein a carrier is divided into sequential time slots and 8 time slots form a frame. In the example, time slots 1, 2, 6 and 7 of frame N are busy, because traffic bursts are transmitted to four mobiles during these time slots. Thus four channels are in use. The time slot of a traffic burst is here illustrated by a box, and during the time slot the pilot signal level is considerably above the input resolution of the receiver, but slightly lower, for example, by 20 dB, than the traffic burst level. In time slots 3, 4, 5 and 8, where no traffic bursts are transmitted, the pilot signal level has been lowered close to the input resolution of the receiver, but still to a level where it can be distinguished from noise. In the following frame n+1, the first time slot has become free (the channel is free) and time slots 2, 6 and 7 are still in use. Whether the time slot is in use or not, pilot signal 4, which is seen in the figure as a small ripple of varying level, is transmitted in each time slot.

The information contained in pilot signal 4 has the same band width as the normal burst 1 transmitted in the time slot, FIG. 2, but it is differently coded, so that it can be extracted from noise. It is especially advantageous to use the CDM method (Code Division Multiplexing) in coding, whereby the pilot signal information is spread over the whole transmission band using a dispersion code. It is advantageous for the dispersion sequence to be directly in a known relation to the synchronizing bursts. It is also possible to use some convolution coding of a high order, either alone or together with CDM coding. When aiming at optimum performance, it is possible to use both coding methods together. With the said codings it is possible to detect a pilot signal, the level of which is lower than the normal input resolution 3 by 15 . . . 25 dB. In some receivers, however, it may be necessary to enlarge the Automatic Gain Control (AGC) in order to cover very low levels as well.

When coding the pilot signal according to the CDM method, it is possible when desired to use different dispersion codes at different base stations, whereby the mobiles are able fully to identify the base stations which transmit the pilot signal. It is true that this adds to complexity, but it allows an operation which is independent of the network, if several operators are operating in the same area.

It is also possible for the pilot signal always to have the same static level. The level may be fixed in every time slot, both in "idle" time slots and also in a time slot containing a traffic burst, as is illustrated in FIG. 2. Since the receiver knows the level of the transmitted signal, it may based on the received signal measure the loss of the radio link in use and it may also conclude if a normal traffic channel would work in such a state. If the loss is bigger than what is acceptable it may not be worth while for it to use the channel, because the transmission power would then have to be increased to too high a level.

The characteristics of the pilot signal have been considered in the foregoing without taking its information contents into account. But it is the content which allows the mobile to conclude the state of the radio interface. The pilot signal contains a limited quantity of information on the base station. In the pilot signal, the message transmitted in each time slot may contain at least the fields shown in FIG. 4.

Firstly, it contains uplink information coded as infobits, that is, information on whether or not any uplink frequency corresponding to this downlink frequency is available for dynamic channel allocation and which uplink time slots are free. It is known that in TDM/FDD systems certain time slot couples of the transmission frame and the reception frame form a two-way traffic channel, whereby the channel is symmetric and comprises, for example, when given a GSM system, one time slot in either direction. Thus, a certain uplink channel corresponds to a downlink channel. However, in data transmission in particular, the channels may be asymmetric, because the requirement of data transmission is usually much bigger in one direction than in the opposite direction, as data is mostly transmitted in a direction from the network to the mobile. Hereby it will be told in the pilot signal which uplink time slots are busy and which ones are free. If Discontinuous Transmission (DTX) is used in the system, whereby the transmitters are turned off for the time when there is nothing to transmit, the pilot signal may be used for indicating specific time slots which are momentarily free.

Secondly, the pilot signal may be used for relaying limited synchronization information, especially time slot timing information. This is not necessary in a GSM system, because all traffic channels are synchronized to the BCCH carrier at the base station. Should synchronization be needed, a frequency correction burst must be transmitted for each carrier. It contains only zero bits and its demodulation results in a pure sine wave, the frequency of which is equal to the frequency of the concerned carrier or is at a predetermined distance from this. It is also possible to synchronize a DCA carrier by using code dispersion on a time slot basis, although this leads to a good correlation result only in the middle of the time slot.

Thirdly, such information may be contained in the pilot signal which in some way identifies the transmitting base station. Thus, a mobile when receiving carriers is able to distinguish from which base station each carrier was transmitted.

For mobiles operating in the network to know that the network has the property according to the invention, this information must be signalled to them. For signalling, that broadcasting channel transmitted by the base station is used, on which also other necessary information is signalled to the mobiles. In a GSM network, this channel is called the Broadcast Control Channel (BCCH). If required, this channel is also used for stating the numbers of those channels which support dynamic channel allocation DCA, even if this is an optional property which may be used to speed up choice of the channel.

When base stations transmit a pilot signal according to the invention, the mobiles must of course in one way or another first receive and then detect it. Mobile functions are described in the following with the aid of FIG. 5.

In a normal traffic connection time slot, reception is not successful because the mobile has enough to do in demodulating the received normal signal and in channel decoding. However, in known mobile systems at least four moments of time can be found, whereby the mobile has time to monitor frequency, phase 51, and to seek the pilot signal.

a) monitoring time slot by which the mobile monitors its own transmission and that of adjacent base stations. It is known that in all cellular systems mobiles monitor strengths of the BCCH carrier signal of adjacent base stations, so the pilot signal can be distinguished from the signal received in this time slot.

b) time slot of the idle frame, whereby there is no transmission in the normal transmission time slot of the traffic channel and no reception in the reception time slot, and the idle frame is a frame during which the mobile does not normally transmit or receive anything.

c) when using Discontinuous Transmission (DTX) that reception time slot of the traffic connection in which nothing is received at that moment. In discontinuous transmission DTX neither the base station nor the mobile will transmit anything, which means that the mobile does not receive anything in the reception time slot relating to this transmission time slot. Thus, this time slot may be used for receiving the pilot signal.

d) when using a less than full speed traffic channel that time slot which has the same time slot number but which due to a lower speed is not in traffic use. The full speed traffic channel is formed by such time slots having the same number which belong to cyclically sequential frames. Halfspeed or slower traffic channels are formed by using time slots having the same number from every second frame or from less frames for traffic use. During time slots which are not used, the mobile may thus receive the pilot signal.

e) that time slot of the traffic channel during which no normal burst is transmitted. Such a situation is possible, for example, when transmitting packet data. In this time slot the mobile may thus receive the pilot signal.

A sixth possibility is to interrupt the normal traffic of the traffic channel for some time, so that the mobile can receive the pilot signal. This is of course troublesome for the recipient and it is thus most suitable for use when the traffic use is packet data transmission.

When the base stations transmit a pilot signal and the mobiles receive it, it may turn out in some cases that the mobiles are not able to detect the pilot signal, phase 52. There are at least three reasons for this: 1) with this carrier no channels are available for dynamic channel allocation, 2) the pilot signal has a poor signal/noise ratio (S/N), because the normal traffic uses the whole time slot and carrier, and 3) the interference level or the noise caused by the environment is too high. Whatever the reason may be of those mentioned, the conclusion is that the channel is not available for dynamic channel allocation, phase 53.

With the mechanisms described above, the mobile after decoding the signal will learn, phase 54, which channels in the downlink and uplink directions are free at each time. If the pilot signal also contains a base station identifier, the mobile will learn which channels are free at the own base station and also at adjacent base stations. With this information the mobile may start a channel exchange from the channel in its use at that time to some free channel, phase 55. The channel exchange criterion may be any suitable one and does not as such belong within the scope of the present invention.

When an exchange of channels is necessary, the mobile examines its memory to find out whether free channels are available at that moment. If no channels are available, it remains on the same channel, whereby the connection or link may be cut off in the worst case, phase 56.

If there are free channels, the mobile will choose a free channel, phase 57, and starts a channel exchange by transmitting access bursts to the base station on the free channel (that is, time slot/frequency) of its choice, phase 58.

If the channel exchange is an intracellular exchange, timing will be automatically correct, because all timings of the same base station are synchronized to the BCCH carrier. If the channel exchange is between cells, the mobile has learnt the timing of the adjacent base station from the pilot signal which it has received from that base station. In both cases, the base station receives burts, accepts the channel by transmitting back an access grant burst on the channel, phase 59, and at the same time immediately transfers the traffic to this new channel chosen by the mobile, phase 60. Correspondingly, the mobile transfers the traffic from the "old" channel to the new channel of its choice after receiving the access grant burst. If there is no access grant burst, the mobile will remain on the old channel, phase 61.

The proposed method is suitable for use especially in an interference-limited cellular micronetwork. This means a network where there may be free channels in a cell, which may not, however, be put into use at the moment, because they would cause too much interference in the connections of other cells. Due to the Rayleigh drop-out, the method is not especially suitable for use when the mobile is moving at a high speed. No big changes need be made in present base stations and mobiles, but what is needed is just extra logic to disperse/decode some bits into the pilot signal and also to detect the time slot timing of another carrier, if the network is not synchronic. In addition, arrangements must be added to the base station so that it can receive access bursts on all traffic channels and not only on the Random Access Channel (RACCH) as in the present systems. Besides, arrangements must be added to the base station so that it can transmit information about the characteristic according to the invention on the broadcast control channel (BCCH).

I claim:

1. A method of allocating a channel in a mobile telephone system, in a radio interface of which transmission and reception take place at different carrier wave frequencies and a transmission frame and a reception frame comprise several time slots, whereby a time slot and frequency form a channel, on which a traffic signal is transmitted as bursts, comprising:

forming at least one message containing information about a base station, transmitting formed messages continuously from the base station via a pilot signal, wherein the frequency of the pilot signal is a same frequency as a carrier wave frequency but the signal level of the pilot signal is lower than the signal level of the traffic signal, the band width of the pilot signal is the same as that of the traffic signal, and wherein each individual message is located in the pilot signal within a period which corresponds to a transmission time slot in terms of time, so that when the message is located in time slots where no traffic signal is transmitted, the signal level of the pilot signal is at a first amplitude lower than the traffic signal and above an input resolution for detection of the pilot signal, and when the message is located in time slots where a traffic signal is being transmitted, the signal level of the pilot signal is but above the first amplitude of the pilot signal where no traffic signal is transmitted lower than the traffic signal level, and after a mobile has received the pilot signal, handover is performed when required to a free channel indicated in the message.

2. The method as defined in claim 1, wherein the pilot signal is of a fixed static level in those time slots where no traffic signal is transmitted.

3. The method as defined in claim 1, wherein the message is located in the pilot signal by using Code Division Multiplexing.

4. The method as defined in claim 3, wherein a dispersion sequence of the pilot signal is directly in a known relation to synchronization bursts.

5. The method as defined in claim 1, wherein the message is located in the pilot signal by using convolution coding of a high order.

6. The method as defined in claim 1, wherein channel state information of the reception frequency corresponding to the transmission frequency of the pilot signal is located in the message.

7. The method as defined in claim 1, wherein the message contains information identifying the base station, whereby when a mobile receives the pilot signal it will know the transmitting base station.

8. The method as defined in claim 1, wherein the mobile receives the pilot signal in a normal monitoring time slot.

9. The method as defined in claim 1, wherein the mobile receives the pilot signal during an idle frame, whereby it does not transmit nor receive any traffic bursts.

10. The method as defined in claim 1, wherein when using discontinuous transmission (DTX) the mobile receives the pilot signal during the time when the base station does not transmit any traffic bursts.

11. The method as defined in claim 1, wherein the mobile receives the pilot signal in those reception time slots which are free when using a less than full speed traffic channel.

12. The method as defined in claim 1, wherein when performing channel exchange, the mobile transmits on the free channel of its choice to the base station an access burst to which the base station responds with an access grant burst, if any, whereupon the traffic is transferred to the chosen channel.

13. The method as defined in claim 1, wherein the pilot signal is transmitted at all carrier frequencies available at the base station.

* * * * *